United States Patent [19]
Blair et al.

[11] 3,909,174
[45] Sept. 30, 1975

[54] CONTINUOUS TUBE FORMING BY MELT BLOWING TECHNIQUE

[75] Inventors: Eugene R. Blair; Robert E. Page, both of Beloit, Wis.

[73] Assignee: Beloit Corporation, Beloit, Wis.

[22] Filed: Dec. 26, 1973

[21] Appl. No.: 427,704

[52] U.S. Cl............. 425/224; 425/324 R; 425/327; 264/165
[51] Int. Cl.[2]........................................ B29D 23/08
[58] Field of Search........ 425/224, 317, 324 R, 363, 425/371, 327; 264/145, 165

[56] References Cited
UNITED STATES PATENTS

| | | | |
|---|---|---|---|
| 3,539,666 | 11/1970 | Schermer | 425/327 X |
| 3,784,667 | 1/1974 | Drostholm | 264/145 |
| 3,809,514 | 5/1974 | Nuneg | 425/371 X |

Primary Examiner—Robert L. Spicer, Jr.
Attorney, Agent, or Firm—Dirk J. Veneman; Bruce L. Samlan; Gerald A. Mathews

[57] ABSTRACT

Apparatus for continuously making a tube of melt blown microfibers. A tube so made is useful as a filter element or the like. Melt blown microfibers are deposited from a linear such fiber generating apparatus longitudinally upon a circumferential surface portion of a stationary, hollow mandrel which is supported at one end thereof. A flexible continuously moving belt in a closed loop spirally extends about the circumferential surface of the mandrel over the area beneath the linear fiber generating apparatus and returns internally through the mandrel via slots. A tubular web formed on this belted circumferential mandrel surface is continuously moved towards the open end of the mandrel where it is continuously withdrawn. Tube characteristics are regulated by belt speed, microfiber deposition rate, tube withdrawal rate, and the like.

2 Claims, 7 Drawing Figures

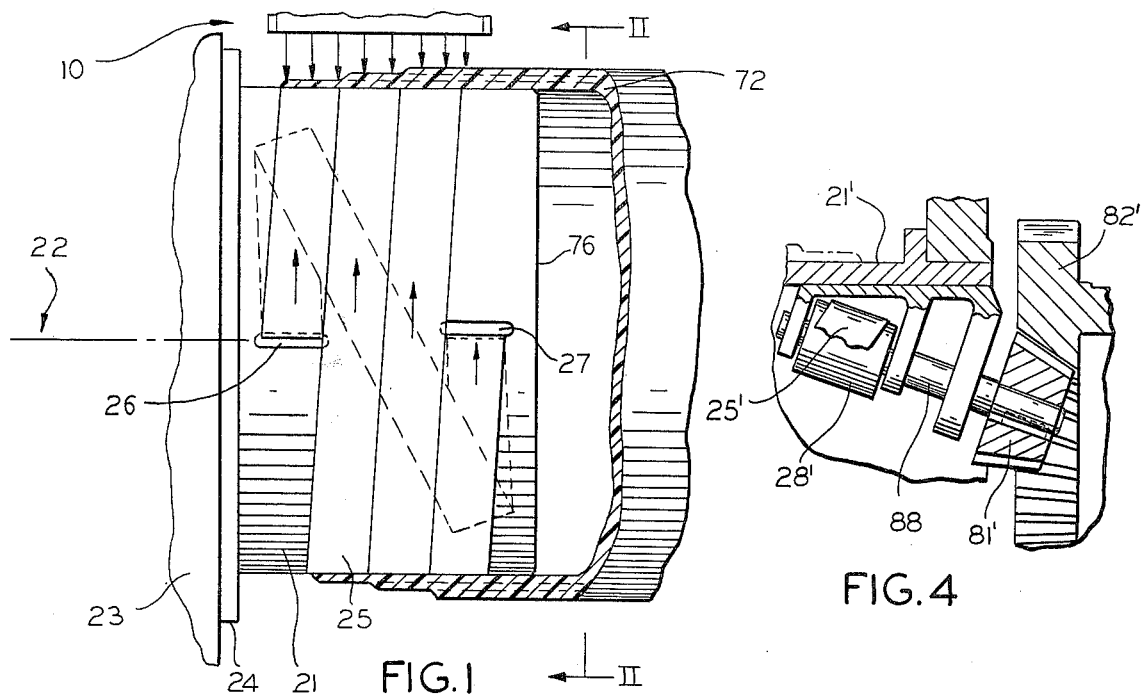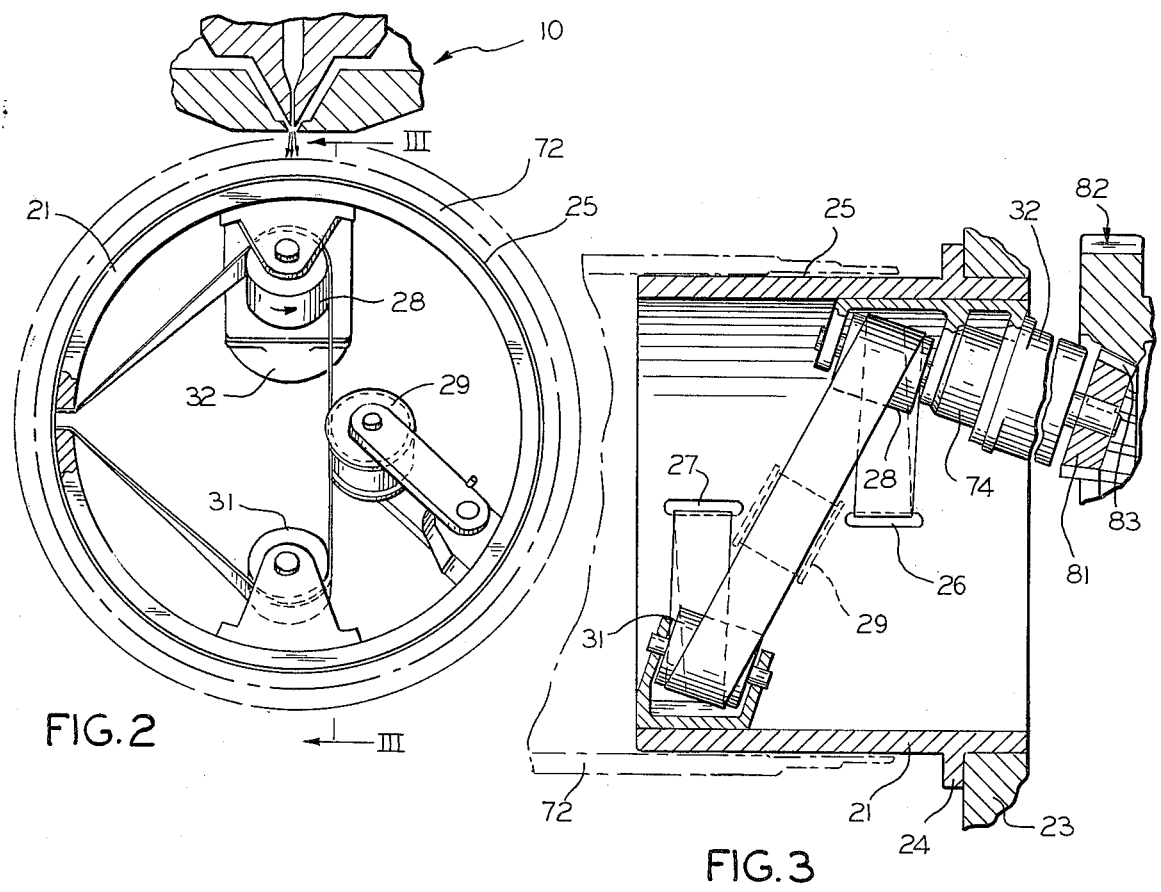

CONTINUOUS TUBE FORMING BY MELT BLOWING TECHNIQUE

BACKGROUND OF THE INVENTION

In the art of producing a non-woven web of melt-blown microfibers, a plurality of spaced, aligned hot melt strands of polymeric material, or the like, are extruded downwardly simultaneously directly into the elongated zone of confluence formed by a pair of heated, pressurized, angularly colliding gas (usually air) streams, each stream typically being in a flat, sheet-like configuration and being on a different, opposed side of such strand plurality. The gas streams break up the strands into fine, filamentous structures, and move such forwardly in a planar configuration so that a non-woven web or mat thereof is continuously laid down upon a moving surface. The U.S. Naval Research Laboratory, Washington, D.C. and Esso Research and Engineering Company, Baytown, Texas, have heretofore reported research and development work on such process. In this process, it is desirable to have the two flattened gas streams employed be substantially uniform and substantially identical to each other as practical (as respects such variables as gas composition, gas temperature, gas pressure, gas volume, stream angle with respect to the forward direction in which the strand plurality is being extruded, and the like). Preferably, each gas stream has a temperature about equal to that of the temperature of the strands in one presently preferred mode of practice.

In such prior art process, the web thus laid down has usually been continuously deposited upon a moving surface which moves generally perpendicularly to a planar configuration of the so generated melt-blown microfibers, and the resulting web has usually been continuously withdrawn from such moving surface in the same general direction of movement. Unfortunately, with this arrangement only one layer or web of microfibers from each melt blown microfiber generating unit can be utilized to make a product web. Also such arrangement does not permit one to make tubular webs.

Although it has heretofore been proposed to generate tubular webs of melt blown microfibers by lengthwise fiber deposition upon a revolving mandrel followed by axial movement of the formed tube from the zone of fiber deposition, such proposal may cause difficult problems of disengaging the so-formed tube from the mandrel circumferential surface, of minimizing friction between mandrel and formed tube, and the like. The art seeks a simple, easy, effective technique for depositing a web of melt blown microfibers generated in a generally planar configuration upon a moving cylindrical surface longitudinally, and thereafter removing the so-deposited tubular web from this surface axially.

BRIEF SUMMARY OF THE INVENTION

There has now been discovered an improved apparatus and process which permits one to generate a tubular web of melt blown microfibers using a cylindrical but spirally revolving surface. A single melt blown microfiber die assembly can generate continuously a web which can have a multiplicity of separately formed layers of such microfibers, the layers being laid down individually and fused together. The web is laid down in a longitudinally direction upon a cylindrical spirally moving surface, and the desired tubular structure is removed from such surface axially at or adjacent one end thereof.

Thus, it is an object of this invention to provide an improved system for making continuously a tube of melt blown microfibers.

Another object of this invention is to provide an apparatus for making a web of melt blown microfibers which is tubular and which can comprise a multiplicity of microfiber layers.

Another object is to provide an apparatus wherein means for generating continuously a planar configuration of melt blown microfibers is cooperatively employed with a cylindrical, spirally moving fiber deposition surface.

Another object is to provide in a melt blown microfiber web generating apparatus a continuous belt spirally movable about a supported, generally cylindrically extending surface so that tubular web configurations may be generated thereon and moved therealong axially.

Another object is to provide a process for generating a tubular web of melt blown microfibers.

Another object is to provide a non-woven tube generating apparatus in which a formed tubular web of fibers is continuously withdrawn in an axial direction from the circumferential surface of a mandrel-like member, such fibers being deposited longitudinally upon an outer circumferential surface portion of such mandrel-like member, such surface portion being spirally segmented spirally advancing.

Another object is to provide, a process for continuously generating a tube of melt blown microfibers from a planar configuration thereof, the process using a curved, spirally moving, segmented surface upon which such microfibers are longitudinally deposited, supported, and advanced, the advancement being in an axial direction relative to the direction of such spiral movement.

Other and further objects, airms, purposes, advantages, utilities, and features will be apparent to those skilled in the art from a reading of the present specification and drawings.

BRIEF DESCRIPTION OF THE DRAWINGS

In the drawings:

FIG. 1 is a side elevational view of the mandrel assembly of one embodiment of apparatus of the present invention, some parts thereof broken away and some parts thereof shown in section;

FIG. 2 is a vertical sectional view taken along the line II—II of FIG. 1;

FIG. 3 is a horizontal sectional view taken along the line III—III of FIG. 2;

FIG. 4 is a fragmentary horizontal sectional view of an alternative embodiment of a belt drive mechanism;

DETAILED DESCRIPTION

Figure 5:
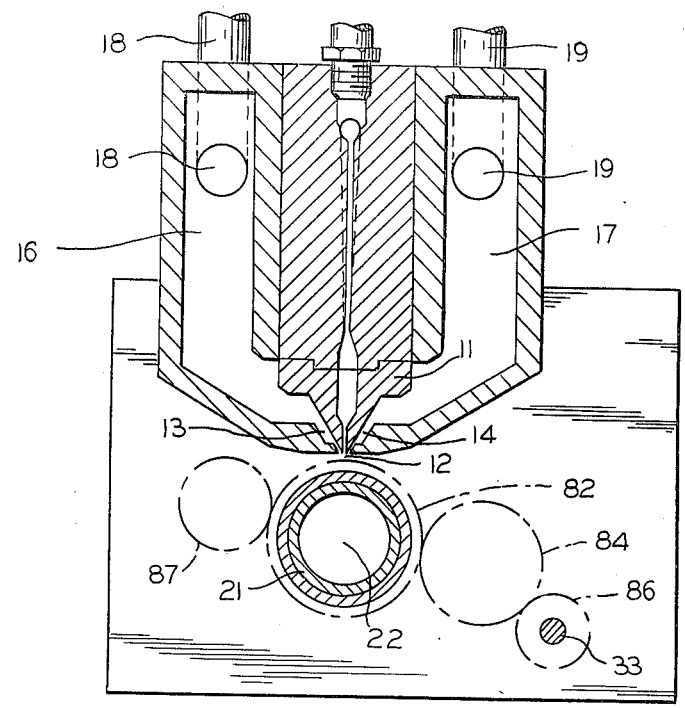
FIG. 5 is a partially schematic assembly view in transverse section of the apparatus embodiment of FIG. 1.

Referring to FIG. 5, there is seen an embodiment of a melt blown microfiber generating apparatus herein designated in its entirety by the numeral 10. The apparatus 10 employs a die head 11 in which a thermoplastic resin (not shown) is heated and from which the molten resin is extruded. A preferred resin is a polyolefin, such as a polypropylene. When polypropylene is employed it is heated initially to temperatures in excess of about 500° to about 900°F, and preferably in the range of from about 600° to 650°F. The face of die body 11 is equipped with a plurality of spaced, parallel, die openings 12 through which the molten thermoplastic resin is extruded. A hot gas (usually air; not shown) exits under substantially identical pressure and temperature conditions from each elongated slot or orifice 13 and 14 on either side of the die openings 12. The hot streams of gas function to attenuate the molten extruded resin strands into fibers essentially in a planar configuration which continuously moves away from the die openings 12.

Gas under pressure is conveniently supplied to each of the slots 13 and 14 from respective chambers 16 and 17, which, in the embodiment shown, are located one on either side of the die body 11. Pressurized, heated gas or air is conveniently fed into the chambers 16 and 17, respectively, from conduits 18 and 19.

Although gas temperatures and pressures can vary widely, depending upon such variables as the resin being stranded through die head 11, process conditions, product desired, and many other variables, typical gas temperatures at a slot 13 or 14 range from about 600° to 700°F while typical gas pressures at slots 13 and 14 range from about 5 to 30 psig. The width of a gas stream issuing from a slot 13 or 14 typically ranges from about 0.010 to 0.020 inch with the length thereof being dependent upon the length of the die body 11. Gas issuing from a slot 13 or 14 is typically moving at a velocity of from about 1200 to 1630 feet per second. Preferably, the interrelationship between each slot 13 or 14 and the die openings 12 is such that the stream angle each of slots 13 and 14 makes with respect to the die openings is identical and ranges from about 15° to 45° with respect to the vertical line midway between the slots 13 and 14 (which preferably is in the center of a plane formed by the microfibers being generated).

The angularly colliding gas streams strike the plurality of spaced, aligned, hot melt strands issuing from openings 12, slot 13 and 14 being on each side thereof, as indicated hereinabove. Each such strand typically initially ranges in average diameter of from about 0.008 to 0.22 inches, and the spacing between strand centers typically ranges from about 0.030 to 0.050. Preferably, the so-extruded, hot melt strands move downwardly vertically, and the die openings 12 are oriented so as to lie substantially in a (hypothetical) vertical plane lying midway between the two colliding gas streams from slots 13 and 14. In one preferred mode of operation, the temperature of the gas streams is approximately equal to that of the hot melt. Those skilled in the art will appreciate that in a melt blown microfiber generating apparatus 10 any convenient duct means may be employed to provide the desired air streams on either side of the die openings 12, and that any convenient means of construction may be used for a die body 11 to provide the desired die openings 12, so that a generally planar configuration of melt blown microfibers is adapted to be continuously generated.

Beneath the die body 11 is positioned a mandrel 21. Mandrel 21 is preferably arranged so that the axis 22 thereof is approximately parallel to the (hypothetical) line (not shown) extending through the centers of the die openings 12. Strands from die openings 12, as attenuated into microfibers by gas from slots 13 and 14 and formed into a generally planar configuration are collected or deposited over circumferential surface portions of the mandrel 21 and form thereon a tubular web 23.

Referring to FIGS. 1 through 3, it is seen that the mandrel 21 is hollow and is supported at one end thereof by a frame member 23, a collar 24 on mandrel 21 being employed to aid mounting stability of the mandrel 21 in the frame 23. Mandrel 21 may be so supported by any means.

A belt 25 is spirally wound about circumferential surface portions of the mandrel 21 commencing from a slotted aperture 26 located in spaced adjacent relationship to the frame 23 to a slotted aperture 27 located similarly to the slotted aperture 26 on the circumferential surface of mandrel 21 but in longitudinally spaced relationship thereto. The belt 25 is arranged so as to have adjacent edge surfaces thereof in the spiral wrap be in close proximate relationship to each other so as to minimize any space gap between adjacent edges of belt 25 about the circumferential surface of mandrel 21. After passing from the exterior circumferential surface of mandrel 21 through slotted aperture 27 into the interior of mandrel 21, the belt 25 is guided by means of rollers, such as rollers 28, 29 and 31, so that its direction of travel is altered thereby permitting the belt 25 to be returned to a position within the interior of mandrel 21 where it may exit through slotted aperture 26 and again enter the spiral wrap configuration illustrated in FIG. 1, the belt 25 being continuous and formed of a flexible somewhat resilient material. Aperture 26 is preferably generally aligned with aperture 27.

In the embodiment shown, the roller 28 is revolvably driven by means of an electric motor 32 which is interconnected with the roller 28 by means of reducing gears located within housing 74. Preferably the width of belt 25 is relatively short, being conveniently in the range of from about 0.05 to 0.10 times the outside radius of mandrel 21 although belt widths which are larger or smaller than these relative values may be employed, as those skilled in the art will appreciate. The portion of the circumferential surface of mandrel 21 which is so wrapped with the belt 25 is generally coextensive with that portion of the circumferential surface of mandrel 21 which is equal to the length of the melt blown microfiber generating apparatus 10, as respects the length of a planar configuration of melt blown microfibers which are to be deposited from a generating apparatus 10 upon the circumferential surface of mandrel 21 in a longitudinal direction, as illustrated, for example, in FIGS. 1 and 2. Preferably many turns of a belt 25 are used. Anti-friction means (rollers) may be used. Mandrel diameters ranging from about 20 to 50 inches appear to be convenient mechanically, though larger or smaller diameter mandrels may be employed as those skilled in the art will appreciate.

In operation, as those skilled in the art will appreciate, the belt 25, in the region under the generating apparatus 10 presents a spirally moving surface (see the arrows marked on belt 25 in FIG. 1) relative to the generating apparatus 10. Melt blown microfibers descend normally (see the vertical arrows depending from generating apparatus 10 in FIG. 1) from generating apparatus 10 and impact against the exposed surface portions of the spirally moving belt 25. As microfibers are laid down upon belt 25 in a mat, the motion of belt 25 imparts a rotational movement thereto so that a product tubular web member 72 moves rotationally during operation of the apparatus of the present invention. A single generating apparatus 10 thus can develop layers of melt blown microfibers in a tubular web member 72 operating in accordance with the teachings of the present invention. Those skilled in the art will appreciate that the speed at which a belt 25 moves combined with the microfiber deposition rate (the latter including such variables as fiber type, thickness, etc.) can be used to control weight, density, tubular web thickness and such variables in a product tubular web structure made by following the teachings of the present invention. Conveniently and preferably a generating apparatus 10 generates a planar configuration of melt blown microfibers whose length ranges from about 6 inches to 18 inches, although ranges which are longer or shorter may be employed conveniently depending upon apparatus and other considerations as those skilled in the art will appreciate.

At the end of the generation of a tubular web member 72 upon a mandrel 21, the interior surface of the web member 72 is readily disengaged from the belt 25 by a stripping action occurring as the belt 25 passes through slotted aperture 27 into the interior of the mandrel 21, the formed web member 72 continuing to move axially and outwardly towards and past the open end 76 of mandrel 21.

A mandrel 21 may be rotatably driven, but such introduces complications in the fabrication of apparatus of this invention.

When it is desired to employ a web member 72 take-up or down stream processing station, it is convenient to employ as a processing station one which rotates at a speed approximating the rotational speed at which a web formed on the belt 25 is turning. Any convenient means for correlating or synchronizing such respective rotational movements may be employed, as those skilled in the art will appreciate.

One such means is illustrated in FIG. 3 where the shaft 77 of motor 32 is extended rearwardly (relative to reducing gear housing 74) and has keyed thereon a beveled gear 81. Gear 81 meshes with a ring gear 82 whose internal circumferential surface 83 is formed into a beveled gear which matingly engages beveled gear 81, gear 82 being mounted for axial rotational movements about the axis 22 of mandrel 21. The outside, circumferential geared surface of ring gear 82 meshes with a reach gear 84 (see FIG. 5) which, in turn, drives a driven gear 86. Gear 86 is keyed to a driven shaft 33, the shaft 33 serving to transfer power to a downstream processing station, one embodiment of which is herein below illustrated.

A similar but alternative arrangement is shown in FIGS. 4 and 5. Here, a ring gear 82' is driven by a motor (not shown) through a drive gear 87 engaging the circumferentially outside geared surface thereof. The beveled circumferentially inside surface of ring gear 82 has teeth which engage a beveled gear 82' which, in turn, is mounted on a shaft 88. Shaft 88 is rotatably mounted and is functionally interconnected with a roller 28'. Roller 28' thus drives a belt 25' over and through a mandrel 21'. Parts similar to the embodiment hereinabove described are similarly numbered but with the addition of prime marks thereto. The ring gear 82' also drives a reach gear 84, driven gear 86, and shaft 33, to complete the desired power transfer.

Figure 6:
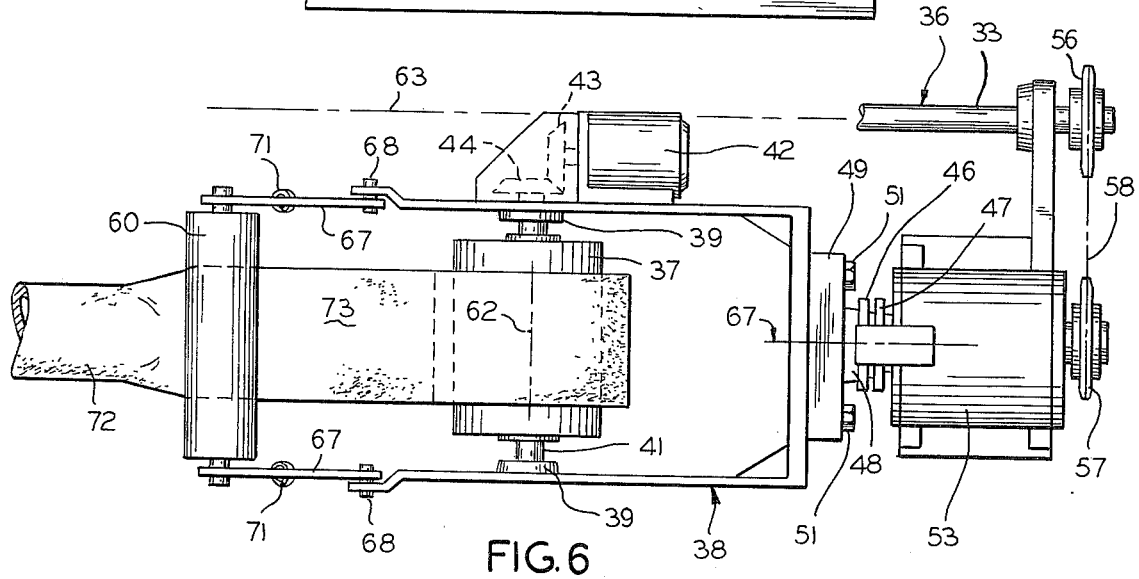
FIG. 6 is a plan view of one embodiment of a rotating winder assembly adapted for continuously withdrawing a tubular web produced in the practice of the present invention.
Figure 7:
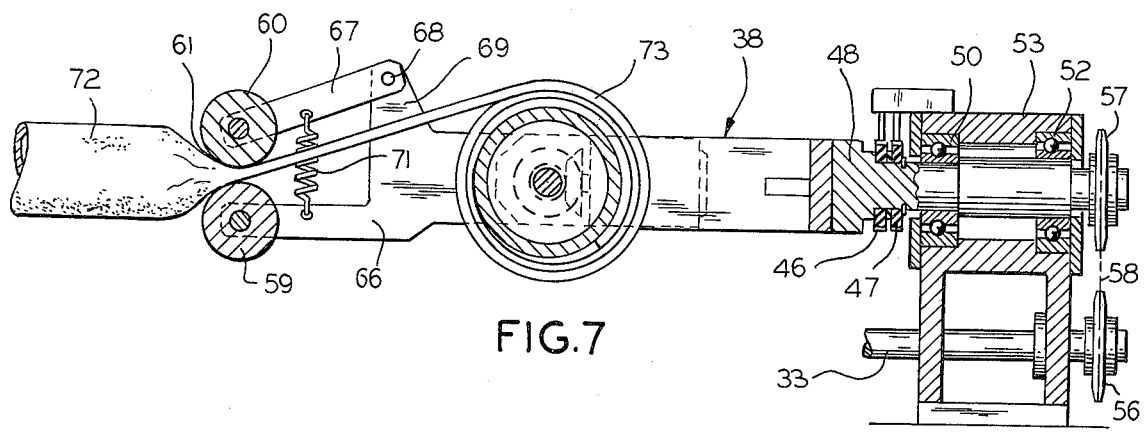
FIG. 7 is a sectional view longitudinally taken through the axis of rotation of the rotating winder shown in FIG. 5.

One embodiment of means for withdrawing continuously a tubular web of melt blown microfibers from a mandrel 21 is illustrated in FIGS. 6 and 7. Here, a rotating winder assembly designated in its entirety by the numeral 36 is equipped with a spindle 37. Spindle 37 is journaled on a shaft 41 transversely between the leg portions of a U-shaped frame member 38 for axial rotational movements in bearings 39 (one bearing being in each such leg portion of frame 38). The shaft 41 is driven by a motor 42 by means of a right angle drive provided by a pair of bevel gears 43 and 44, gear 43 being secured to the drive shaft of motor 42 and bevel gear 44 being secured to an end of shaft 41. The motor 42 is driven through appropriate electrical conduits (not shown) through slip rings 46 and 47 mounted on a shaft 48. The shaft 48 is secured to the center of the base of frame 38 by a plate 49, plate 49 being secured to frame 38 by means of bolts 51 which are threadably received in the base of frame 38. The shaft 48 is mounted for axial rotational movements in a pair of thrust bearings 50 and 52. The bearings 50 and 52 are also adapted to support functionally the frame 38 and various attachments thereto, as herein described. The bearings 50 and 52 are mounted in axially fixed, spaced parallel relationship to each other to a frame 53. Frame 53 also mounts the terminal end portion of the driven shaft 33, shaft 33 being journaled for rotational movements by a bearing 54 mounted in frame 53. Pulleys 56 and 57, on terminal ends of shafts 33 and 48, respectively, are interconnected together by means of a drive belt 58 so that pulley 56 drives pulley 57 which, in turn, rotatably drives the shaft 48, and rotates the spindle 37 end-over-end, the axis 62 of spindle 37 being normal to the axis 22 of mandrel 21. Thus, spindle 37 is adapted both to revolve end-over-end about the axis 61 of shaft 48 at a rate approximating the rotational speed of the mandrel 21, and simultaneously to revolve about its own axis 62. The axis 61, of shaft 48 is preferably aligned with the axis 22 of mandrel 21, the axis 63 of shaft 33 being located so that motor 42 clears shaft 33 as frame 38 revolves.

An optional but preferred feature of the rotating winder assembly 36 is a pair of rollers 59 and 60 which are so positioned as to have their nip region 64 be in spaced, parallel relationship to the axis 62 of spindle 37. The roller 58 is mounted for rotational movements between the paired forward ends 66 (paired) of the frame 38 for rotational movements relative thereto. Roller 59 is mounted for rotational movements between a pair of flattened arms 67, the forward end of each flattened arm 67 joining an opposite end of roller 59. The rear end of each arm 67 is pivotally mounted on a pin 68. Pin 68 is, in turn, mounted on a flange 69 upstanding from frame 38 at the base of each forward end 66. The roller 60 is yieldingly biased towards the roller 59 and the nip region 61 therebetween by means of a pair of springs 71, each spring 71 extending between an arm 67 and an adjacent forward end 66.

In operation of the rotating winder assembly 36, a tubular web member 72 formed on the mandrel 21 passes between the rollers 58 and 59 and is collapsed and flattened. The collapsed tubular web 73 is then advanced and is convolutely wound about the circumferential surfaces of the spindle 37 as the shaft 41 thereof is driven by motor 42, the speed of motor 42 being adjusted to provide a predetermined, desired draw rate for removing the tubular web 68 from the mandrel 21.

In place of assembly 36, one may employ any convenient means for handling a tubular web member emitted from the end of mandrel 21, as those skilled in the art will appreciate.

The tubular web 68 removed from a mandrel 21 can be cut into sections (as by means not shown) for use as tubular filter elements instead of being convolutely wound as on a spindle 37.

The tubular web 68 removed from a mandrel 21 can be cut into sections (as by means not shown) for use as tubular filter elements instead of being convolutely wound as on a spindle 37.

Other and further embodiments and variations of the present invention will become apparent to those skilled in the art from a reading of the present specification taken together with the drawings and no undue limitations are to be inferred or implied from the present disclosure.

EMBODIMENTS

The present invention is further illustrated by reference to the following Example. Those skilled in the art will appreciate that other and further embodiments are obvious and within the spirit and scope of this invention from the teachings of this present Example taken with the accompanying specification and drawings.

EXAMPLE 1

Using an apparatus configuration such as generally illustrated in FIGS. 1 through 3 a polypropylene web of melt blown microfibers is laid down upon a stationary mandrel equipped with a spirally wrapped belt. The mandrel outside diameter is about 30 inches and the unit is equipped with about 10 ful turns of belt. The mandrel is equipped with rollers to facilitate belt movement. The belt has a transport speed of about 10 rpm and the belt has a width of about 2 inches. The mandrel has an outside diameter of about 30 inches. The die from which the microfibers are generated in a planar configuration has a length of about 10 inches and the die orifices are about 0.015 inches in diameter with the spacing between orifice centers being about 0.050 inches. Strands are extruded from the die at a temperature of about 620°F and the air stream on each side of the die head has a width of about 12 inches and is at about the same temperature as the strands and has a flow rate of about 130 CFM. Each stream makes an angle (relative to the vertical) of about 30°. The microfibers at the time they impinge on the cylindrical surface of mandrel are estimated to have average diameters in the range from about 2 to 4 micro inches. The tubular web thus formed on the mandrel is continuously manually withdrawn axially from the open end of the mandrel at a rate of about 1.7 feet per minute. Tube lengths of convenient size are continuously cut from the end of the continuously generated tubular web as such is emitted from the mandrel. The tube wall thickness is estimated to be about 0.050 inch. The tube sections thus formed are suitable for use as filter media for air, fluids, and the like.

Tube sections can be slit for use as flat sheet for many products. This, in fact, is the real use for this material, i.e., wide sheets.

The claims are:

1. Apparatus for continuously making a tube of melt blown microfibers comprising
   a. a mandrel, having a chamber defined interiorly thereof,
   b. support means supporting said mandrel in the region of one end thereof,
   c. a pair of apertures formed in circumferential portions of said mandrel in generally axially spaced relationship to each other and communicating with said chamber,
   d. a continuous flexible belt member, said belt member
      1. being spirally wrapped about circumferential portions of said mandrel between said pair of apertures and adapted to make slidable engagement with said wrapped circumferential portions,
      2. extending slidably through each of said apertures at opposite ends of said wrapped circumferential portions,
      3. being interconnected with itself through said chamber between said apertures,
   e. belt drive means including guide means within said chamber and adapted to move continuously said belt longitudinally thereof and spirally about said wrapped circumferential portions in a direction away from said one end,
   f. means for continuously generating a generally planar configuration of melt blown microfibers, said means being positioned and adapted to deposit longitudinally upon said wrapped circumferential portions a web of melt blown microfibers,
   g. means for continuously collecting generally axially from the opposite end of said mandrel a tubular web of microfibers formed on said belt over said flexible felt member as said belt member so moves and as said microfibers are being so deposited thereon by said generating means, said collecting means comprising a spindle rotatable on its axis and adapted to wind convolutely upon circumferential surface portions thereof in a collapsed, flattened form such tubular web, the axis of said spindle extending generally through, and being generally normal to, the axis of said mandrel and in spaced relationship to said opposite end thereof, said spindle being further adapted to rotate end-over-end generally about the axis of said mandrel,
   h. collecting drive means adapted to rotate said spindle end-over-end at a rate approximating the radial speed of said flexible belt member over said circumferential portions,
   i. spindle drive means adapted to rotate said spindle on its axis at a rate approximating the axial speed of said flexible belt member over said circumferential portions, and
   j. roller means adapted to collapse and flatten such tubular web before such is so convolutely wound upon said spindle, said roller means being adapted to rotate with said spindle about the axis of said mandrel as said spindle rotates.

2. The apparatus of claim 1 wherein said microfiber planar configuration is generally aligned with the axis of said mandrel.

* * * * *